United States Patent [19]

Shields

[11] 4,130,315
[45] Dec. 19, 1978

[54] MOTORCYCLE FAIRING WITH VENT MEANS

[76] Inventor: William D. Shields, P.O. Box 672, R.R. 6, Lake Edgewood, Martinsville, Ind. 46151

[21] Appl. No.: 775,633

[22] Filed: Mar. 8, 1977

Related U.S. Application Data

[63] Continuation-in-part of Ser. No. 658,036, Feb. 13, 1976, Pat. No. 4,010,976.

[51] Int. Cl.² .............................................. B62J 17/02
[52] U.S. Cl. ................................. 296/78.1; 280/281 B
[58] Field of Search .......................... 296/78.1, 84 R; 280/281, 289 R, 289 S; D12/182

[56] References Cited

U.S. PATENT DOCUMENTS

| 1,374,475 | 4/1921 | Shaughnessy | 296/78.1 |
| 3,787,088 | 1/1974 | Dreyer | 296/78.1 |

*Primary Examiner*—Joseph F. Peters, Jr.
*Assistant Examiner*—Gene A. Church
*Attorney, Agent, or Firm*—Woodard, Weikart, Emhardt & Naughton

[57] ABSTRACT

A motorcycle fairing is disclosed herein which comprises a one-piece, formed or molded sheet of plastic, such as acrylic or fiberglass, having portions which extend in front of and above the motorcycle handlebars, and further including leg portions which extend downwardly along the opposite sides of the front fork of the motorcycle. The leg portions include panels pivotally attached thereto and positionable to direct air onto the engine or the rider in warm weather and to seal off the air in cooler weather. The motorcycle fairing is attached to the handlebars with brackets, and also with a gasket which extends along the inside edge of the fairing and engages the front fork and lights of the motorcycle. The gasket aids in securing the fairing to the motorcycle, absorbing vibrations due to the road and motorcycle, and permits the fairing to fit different size motorcycles.

3 Claims, 6 Drawing Figures

MOTORCYCLE FAIRING WITH VENT MEANS

CROSS-REFERENCE TO RELATED APPLICATION

This application is a continuation-in-part of my application having Ser. No. 658,036, filed Feb. 13, 1976 and issued on Mar. 8, 1977 as U.S. Pat. No. 4,010,976.

BACKGROUND OF THE INVENTION

1. Field of the Invention

This invention relates to the field of windshields and fairings for motorcycles, and more particularly to a fairing vent for directing air toward the engine or rider.

2. Description of the Prior Art

A number of products have been designed to better protect the motorcycle rider from the myriad of problems and dangers which arise from motorcycle riding. A major concern involves the comfort and safety of riders with respect to articles which may strike the rider as he is moving. Articles carried by the air and items which may be thrown up from the street or from other vehicles could easily injure or otherwise interfere with the unprotected rider. Without some type of protective enclosure the rider is also more susceptible to rain and cold and also the tiring effect of fighting the flow of air which comes with riding at high speeds. Energy efficiency is also enhanced as a result of the increased gas mileage provided by the aerodynamics of the fairings.

Motorcycle windshields have been in use for some time. They are desirable in that they are generally inexpensive, light-weight, and simple to install on the motorcycle. Windshields, however, provide only very minimal protection to the motorcycle rider. The windshields particularly fail to afford protection for the rider's hands, arms and legs.

Motorcycle fairings provide increased protection for the motorcycle rider, and generally are of two types. Fairings which are mounted on the handlebars comprise formed windshields attached to a fiberglass base, the fairing being mounted upon the handlebars with brackets. This type of fairing still fails to provide good body protection for the rider, and is generally unstable and will vibrate at highway speeds. Frame-mounted fairings afford the motorcycle rider the maximum amount of body protection. These "full" fairings, however, are expensive, heavy, and detract from the aesthetic appearance of the motorcycle. They also require much time and effort for installation on the motorcycle, and the stability and vibration resistance of the full fairings should be improved.

SUMMARY OF THE INVENTION

A motorcycle fairing is described herein which comprises a formed sheet of transparent material, the formed sheet including first portions extending across and spaced apart from the front of the motorcycle handlebars, a second portion extending above the handlebars to shield the motorcycle rider's face, and third portions extending downwardly along opposite sides of the front fork of the motorcycle, the third portions including vent means for directing air onto the motorcycle and a rider of the motorcycle.

It is an object of the present invention to provide a motorcycle fairing which affords full protection to the motorcycle rider and which includes a vent for directing air at the motorcycle engine and/or rider.

A further object of the present invention is to provide a motorcycle fairing which forms a tight, wind-resistant seal around the front of the motorcycle.

Another object of the present invention is to provide a motorcycle fairing which is aesthetically pleasing.

A further object of the present invention is to provide a motorcycle fairing operable to direct cooling air onto the motorcycle engine to provide more efficient operation and to prolong the life of the engine.

Yet another object of the present invention is to provide a motorcycle fairing which is easily installed on a motorcycle, and which vibrates a minimum amount.

Further objects and advantages of the present invention will become apparent from the figures and description which follow.

DESCRIPTION OF THE PREFERRED EMBODIMENT

Figure 1:
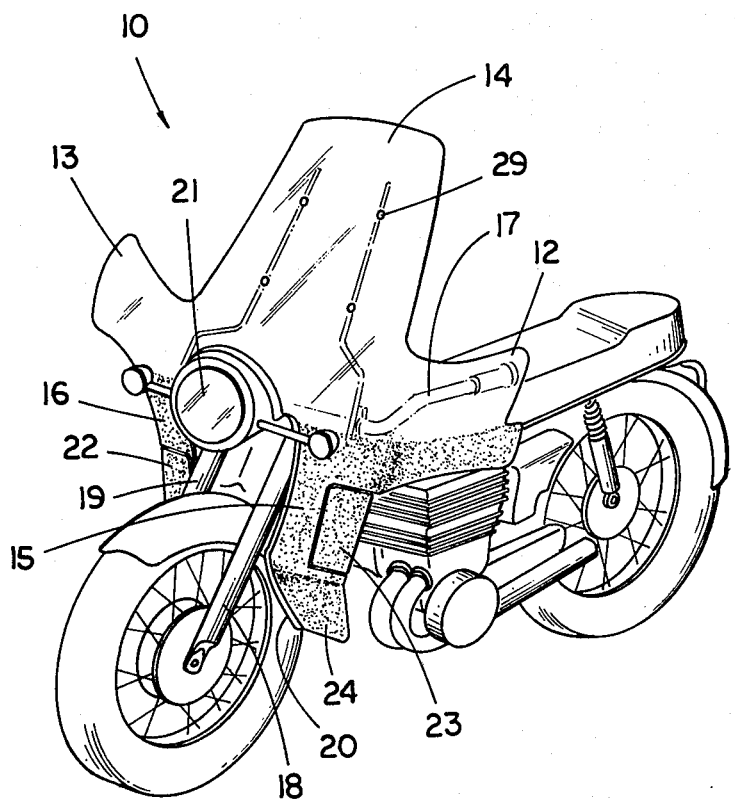
FIG. 1 is a perspective view of the motorcycle fairing of the present invention mounted upon a motorcycle.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
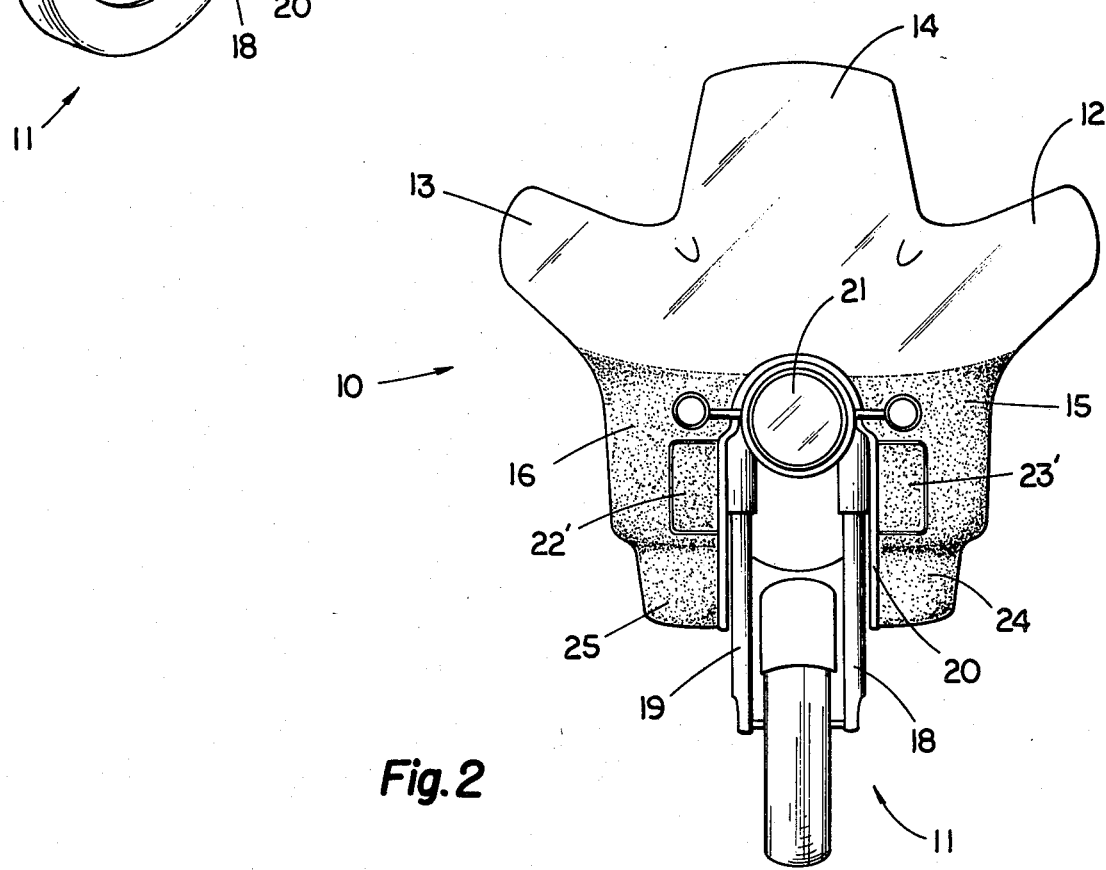
FIG. 2 is a front view of the fairing and motorcycle of FIG. 1.

Referring now to FIGS. 1 and 2, there is shown a motorcycle fairing 10 according to the present invention. The fairing 10 is shown mounted upon a motorcycle 11 and includes first portions 12 and 13, second portion 14, and third portions 15 and 16. First portions 12 and 13 extend across and are spaced apart from the front of the motorcycle handlebars 17. Second portion 14 extends above the handlebars 17 and third portions 15 and 16 extend downwardly along opposite sides of the front fork members 18 and 19, respectively.

Figure 4:
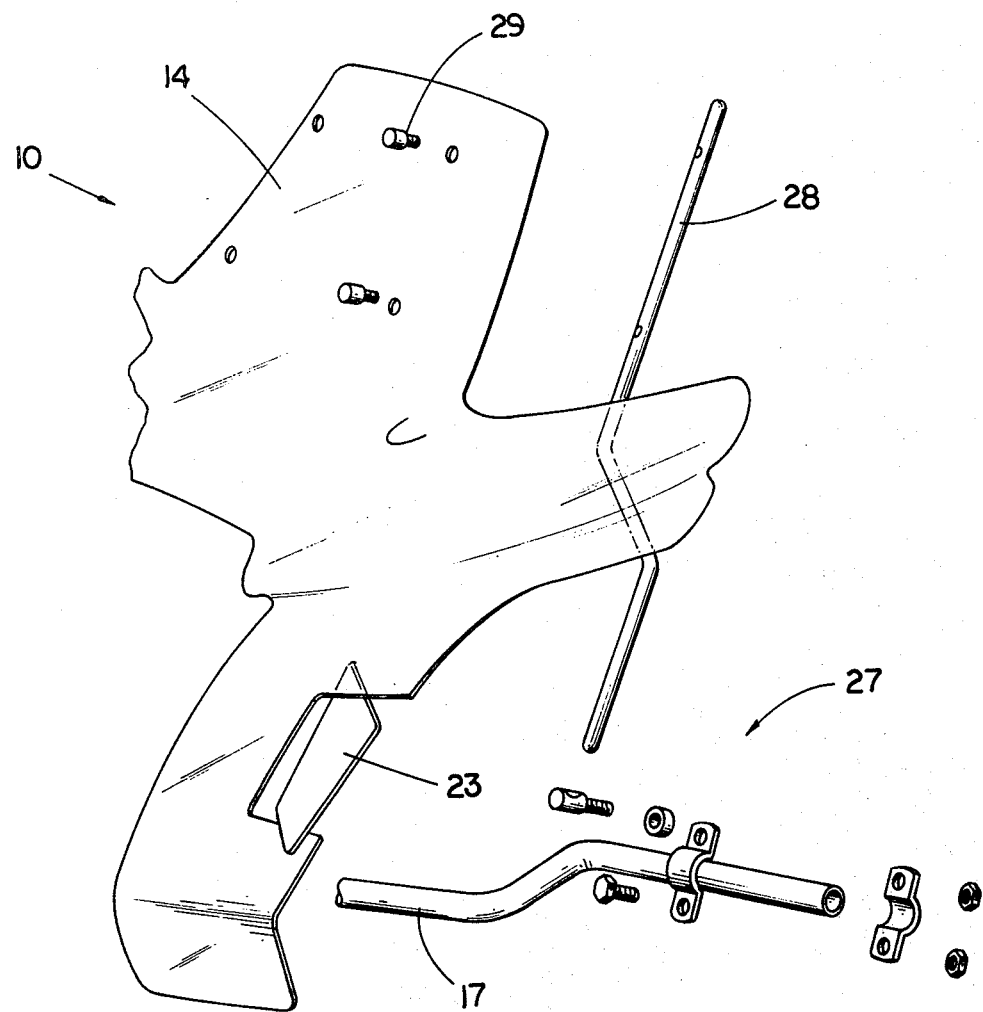
FIG. 4 is an exploded view of the fairing of the present invention, showing the bracket assembly used to attach the fairing to the motorcycle handlebars.

Second portion 14 is attached to the handlebars 17 by brackets, as is more clearly shown in FIG. 4. The motorcycle fairing 10 further includes a gasket 20 which extends along third portions 15 and 16. The gasket comprises a flexible, resilient material which may be deformed against the adjacent parts of the motorcycle to form a tight friction fit. To install the fairing 10 onto a motorcycle, the third portions 15 and 16 are flexed apart from each other, and the fairing is lowered onto the front portion of the motorcycle. With the fairing in the proper position, the third portions are allowed to spring back to their normal position and gasket 20 is thereby deformed against and tightly fits with the adjacent portions of the motorcycle. The fairings and gasket are preferably designed to have the gasket frictionally engage the headlight assembly 21 and the front fork members 18 and 19. This will increase the effectiveness of the gasket in holding the fairings to the motorcycle and in reducing the vibrations of the fairing.

The fairing 10 may be formed from any hard, transparent material. The shape of the fairing is most conveniently achieved by molding a sheet of plastic material. It has been found that 3/16 inch Lucite AR, a product of the DuPont Company of Wilmington, Delaware, is well suited to be used as the fairing material. Lucite AR has good abrasion and impact resistance, high strength and hardness, is light weight, and cleans and weathers well. In addition, the material is easily formed and fabricated.

The exact shape of the fairing is, of course, alterable to suit the dimensions of the motorcycle. The size and contour of the various portions of the fairing may also be varied according to the tastes of the particular manufacturer. It is preferable, however, that the third portions of the fairing be shaped to have the gasket 20 engage the headlight assembly 21 and the front fork members 18 and 19 in order to maximize the stability and air tightness of the fairing. The bottoms 24 and 25 of third portions 15 and 16 are preferably shaped to direct air downwardly away from the rider's legs and feet. More preferably, the bottoms 24 and 25 should, if the design of the motorcycle permits, deflect the air downwardly toward the intake manifold of the motorcycle engine. This will promote efficiency of the motorcycle engine while also accomplishing the desired effect of protecting the rider's legs and feet from objects which may be thrown up from the street or carried in the air.

As seen generally in FIGS. 1 and 2, the motorcycle fairing of the present invention provides a substantial shield of protection for the motorcycle rider. The air encountered by the moving motorcycle is deflected to the top, bottom and both sides of the motorcycle and the rider. The hard plastic fairing provides protection against objects which would otherwise strike the rider, but does not interfere with the rider's view of the road. The one-piece construction of the fairing makes it easy to install and also reduces the amount of vibration. In addition, the gasket operates to absorb the vibrations of the motorcycle and reduces the transmission of those vibrations to the fairing. The third portions 15 and 16 of the motorcycle fairing could also be colored or painted to improve the aesthetic appearance of the fairing. This coloring could be accomplished either during the process of manufacturing the fairing, or the backs of the third portions could be painted at a later time.

Figure 3:
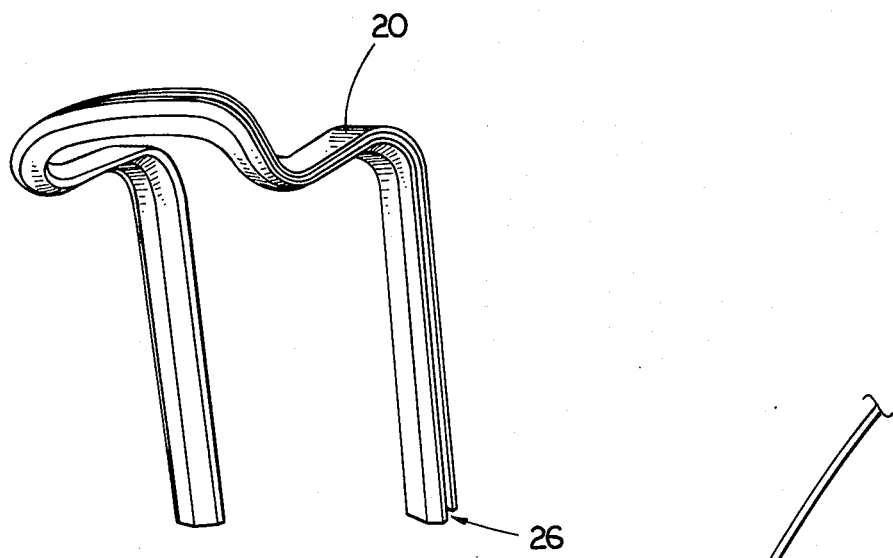
FIG. 3 is a perspective view of the gasket utilized by the fairing of the present invention.
Figure 6:
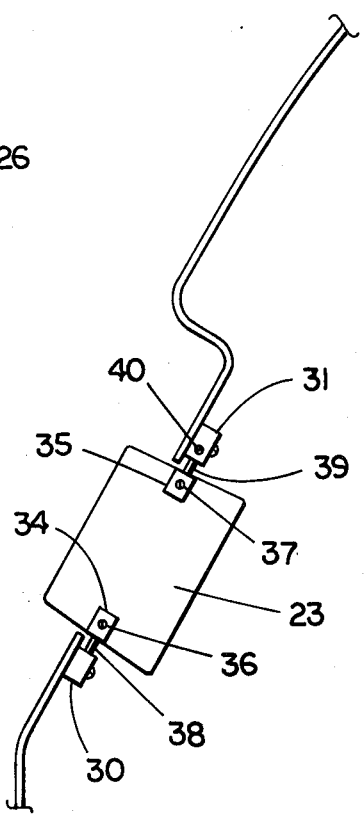
FIG. 6 is a partial, side view as in FIG. 5 except showing the vent in an open position.
Figure 5:
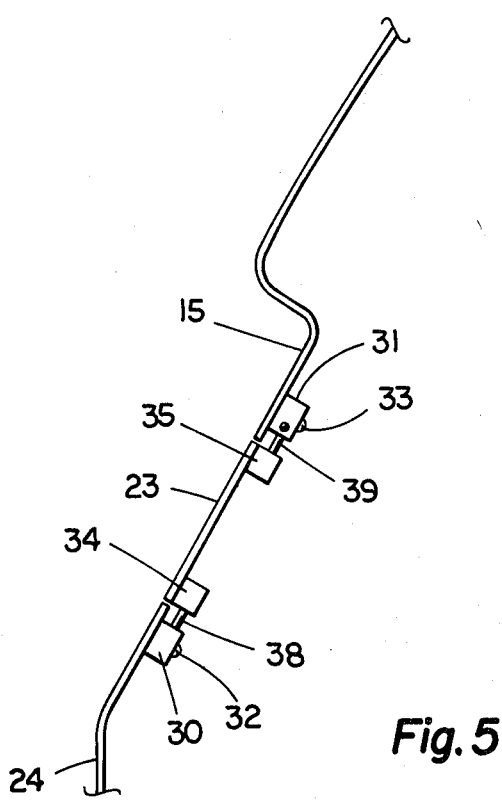
FIG. 5 is a partial, side view of the fairing of FIG. 1 showing the details of the vent.

Depicted in FIG. 3 is the gasket 20 of the present invention. As noted previously, the gasket should comprise a flexible and resilient material to permit the third portions of the fairing to compress the gasket against the adjacent portions of the motorcycle. The gasket preferably comprises a foamed material which is resistant to deterioration due to weather and gasoline. Vinyl, urethane or rubber foam has been found to be appropriate. The material may be molded or extruded to form the required shape. The gasket includes a groove 26 which receives the edges of the third portions of the fairing and is secured thereto either frictionally or with an adhesive. To install the fairing, the gasket is fitted onto the third portions and the fairing is lowered onto the front of the motorcycle as previously described. The gasket should be of sufficient size to permit substantial compression of the material between the third portions and the motorcycle. This will insure that the junction between the fairing and the motorcycle will permit a minimum amount of air and materials to flow between them, and will maximize the firmness of the attachement of the fairing to the motorcycle.

As shown in FIG. 4 the motorcycle fairing includes identical bracket assemblies such as 27 for attaching the fairing 10 to the motorcycle handlebars 17. Bracket assembly 27 is essentially the same as the bracket assemblies which are commonly employed for attaching fairings or windshields to motorcycles. The top of rod 28 is attached to the second portion 14 of the motorcycle fairing with bolts such as 29 which pass through aligned apertures in the two elements. The bottom of rod 28 is attached to the handlebars 17 by bracket assembly 27 as is well known.

The motorcycle fairing 10 includes vent panels 22 and 23 rotatably mounted upon third portions 16 and 15, respectively. The vent panels 22 and 23 are preferably positioned along the outside edge of the third portions, as depicted in FIG. 1. Alternatively, the panels could be placed at other locations, such as along the interior of third portions 16 and 15, as shown by vent panels 22' and 23' of FIG. 2.

Vent panels 22 and 23 are mirror images of one another, and therefore only panel 23 will be described in detail herein. Panel 23 comprises a flat and preferably rectangular sheet of material, preferably being formed from a material identical with that from which the main body of fairing 10 is formed. Vent panel 23 is positioned within a complementary shaped opening in third portion 15 and is rotatably mounted thereto. Support blocks 30 and 31 are secured to third portion 15 by screws 32 and 33. Identical support blocks 34 and 35 are mounted to vent panel 23 by screws 36 and 37. Pivot pins 38 and 39 are received within aligned holes in support blocks 30 and 34 and in support blocks 31 and 35, respectively. Panel 23 is thereby rotatable about pivot pins 38 and 39 and may be positioned in a variety of pre-selected positions relative third portion 15 of fairing 10. A set screw 40 having an enlarged head portion to function as a handle is threadingly received within support block 31 and is tightened against pivot pin 39 to secure the vent panel 23 in a selected position. Alternatively, vent panel 23 is sized to frictionally engage the surrounding, complementary opening in third portion 15, and thereby retains a selected position until repositioned by the operator of the motorcycle.

While there have been described above the principles of this invention in connection with specific apparatus, it is to be clearly understood that this description is made only by way of example and not as a limitation in the scope of the invention.

What is claimed is:

1. A motorcycle fairing which comprises:
   a formed sheet of transparent material, the formed sheet including first portions extending across and spaced apart from the front of the motorcycle handlebars, a second portion extending above the handlebars to shield the motorcycle rider's face, and third portions extending downwardly along opposite sides of the front fork of the motorcycle; and
   vent means associated with at least one of the third portions for directing air toward the motorcycle and rider, said vent means comprising a vent panel and further comprising mount means for rotatably mounting the vent panel to one of the third portions, the third portion defining an opening within which the vent panel is rotatably received.

2. The motorcycle fairing of claim 1 in which the mount means comprises a first support block attached to the third portion and a second support block attached to the vent panel, the first and second support blocks defining aligned mutually-facing cylindrical holes, the mount means further including a pivot pin having two ends, each end of the pivot pin being received within one of the holes defined by the first and second support blocks.

3. The motorcycle fairing of claim 2 and which further includes vent control means for controlling the position of the vent panel relative the third portion to which the vent panel is mounted, said vent control means including a set screw threadingly received by one of the first and second support and positionable against the pivot pin received therein, the pivot pin being rotatably received by one of the first and second support blocks in which the set screw is received and being secured to the other of the first and second support blocks.

* * * * *